Oct. 11, 1932.   G. W. PIERCE   1,882,396
MAGNETOSTRICTIVE TRANSFORMER
Filed March 23, 1928
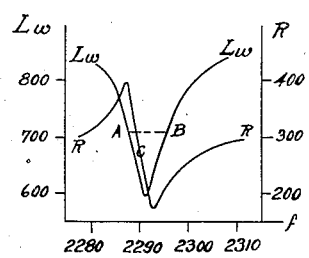
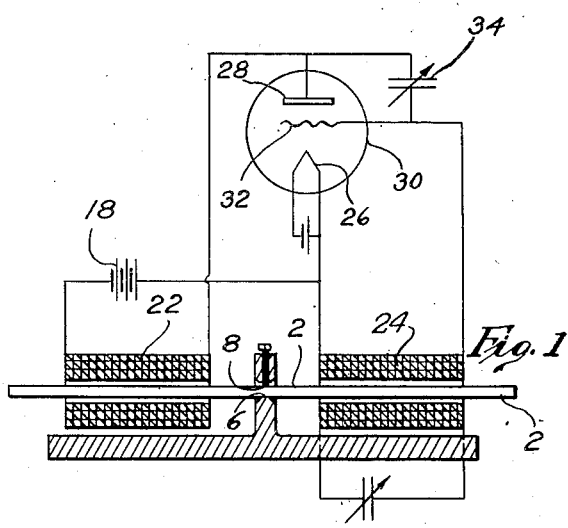
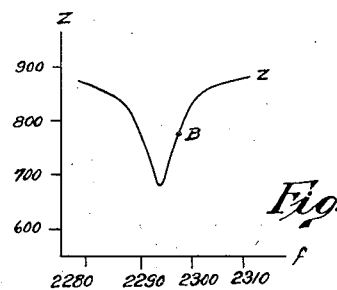
Inventor
George W. Pierce
By David Rines
Attorney Patented Oct. 11, 1932

1,882,396

UNITED STATES PATENT OFFICE

GEORGE W. PIERCE, OF CAMBRIDGE, MASSACHUSETTS

MAGNETOSTRICTIVE TRANSFORMER

Application filed March 23, 1928, Serial No. 264,222, and in Canada December 31, 1927.

The present invention relates to vibratory systems and apparatus, and more particularly to electrical systems and apparatus employing magnetostrictive vibrators. From a more limited aspect, the invention relates to the transfer of periodic, electric energy from one electric system to another.

A chief object of the invention is to provide a new and improved magnetostrictive transformer.

A further object is to provide a new and improved transformer of the above-described character having a tuned magnetostrictive vibrator.

Other objects will be explained hereinafter and will be particularly pointed out in the appended claims.

The invention will be explained in greater detail in connection with the accompanying drawings, in which Fig. 1 is a diagrammatic view illustrating the novel transformer of the present invention, as applied to a vacuum-tube oscillator for producing sustained vibrations and alternating currents; and Figs. 2 and 3 are plots of experimental results.

The magnetostrictive vibrator disclosed in Letters Patent No. 1,750,124, granted March 11, 1930, upon application Serial No. 158,452, filed January 3, 1927, may, in accordance with the present invention, be used as a transformer to couple several circuits together in order to transmit energy from one circuit to another at a given frequency. When an alternating current that is close to, or substantially the same as, the critical, natural frequency of mechanical vibrations of the vibrator core, flows in one circuit, the amplitude of vibration of the core, though still small, becomes relatively quite large. The core will then react inductively on the load to render its consumption of power critical as to frequency for frequencies near the free frequency of the core. The mechanical damping of the core, mounted as shown, is as small as possible, with the result that the resonant response of the core is very sharp and pronounced. The vibrator core is caused to vibrate energetically and thus transmit energy to the other circuit. Thus, in the system of Fig. 1, a magnetostrictive core 2 is shown positioned axially of a magnetic field, here shown as produced by the coils 22 and 24. It is preferably held in such manner, as by means of the centrally positioned clamps 6 and 8, as freely to vibrate mechanically by magnetostriction longitudinally about a nodal point at its center, with a period of vibration equal to the period of the alternating, electromotive force.

The operation will be better understood in connection with the plot of Fig. 2, showing the relation between the resistance R and the reactance $L\omega$ of the winding 22 or 24 for different frequencies of applied electromotive force in the neighborhood of the natural or free frequency of the core. The axis of abscissae represents the applied frequency $f$ (number of cycles per second) of the electromotive force, and the ordinate is, in the case of one curve, the reactance $L\omega$, and in the other, the resistance R, both measured in ohms. $\omega$ is an abbreviation for $2\pi f$. The particular core employed in the experiment was of nickel-steel, about 0.92 cm. long, and had a free frequency of fundamental longitudinal vibration of about 2290 cycles per second. As the curves of Fig. 2 clearly show, the reactance $L\omega$ and the resistance R undergo marked effects, the former sinking to a minimum in the neighborhood of the resonant frequency of the core, and the latter at a frequency somewhat greater.

In Fig. 3, the total impedance Z of the winding 22 or 24 is similarly plotted against the applied frequency $f$ of the electromotive force. The values of Z shown in this plot were obtained by taking the square root of the sum of the squares of the resistance R and the reactance $L\omega$ of Fig. 2. According to this plot, the impedance Z of the winding 22 or 24 is at a minimum at a frequency of about 2291 cycles per second. The current in the circuit will therefore be a maximum of current when the frequency has this value.

Any material having suitable properties may, of course, be used for the vibrating body 2, but it should obviously be constituted of material that is suitably magnetizable. The core may be in the form of a simple rod or tube of the proper material, or it may have any desired other form, as stated in the said Letters Patent; but to obtain the best results, depending upon the purpose for which the apparatus is used, the core should be characterized by comparatively large magnetostrictive effects and comparatively low vibrational decrement. Such effects exist in magnetic metals and magnetic alloys. Different bodies possess the requisite properties in different degrees. Alloys containing nickel, chromium, cobalt and steel, in proper proportions, have comparatively large magnetostriction. Thus, alloys consisting of iron and chromium, or nickel and chromium, nickel and cobalt, or nickel and iron, also nickel and copper, form very good magnetostrictive vibrators. Alloys of three or more of these elements may also be advantageously employed. This is discussed at greater length in the said Letters Patent. The material employed depends upon the purpose for which the apparatus is used. If high precision of frequency is desired, the metal should have a high constancy of elasticity. If great sensitiveness, rather than precision, is the aim, the metal may have less constancy of elasticity, but higher sensitivity.

In addition to one or more natural fundamental frequencies of mechanical vibration, the core has also frequencies of vibration determined by the operation of the core in halves, thirds, fourths, fifths and other overtones. There will usually, therefore, be more than one specific frequency of magnetization at which the core will resonate as above described. Such other modes of vibration may be produced by particular methods of stimulating the vibrations, or by particular modes of clamping the body. In addition to other modes of longitudinal vibration, there are certain magnetostrictive effects attendant upon the twist or torsion of the cores, particularly if current be sent lengthwise through the core, so that torsional vibrations are also available. All these modes and kinds of vibration may be utilized according to the present invention.

At frequencies as high as 200,000 cycles per second, a solid nickel-steel, nichrome, or chromium-steel rod is highly efficient even when its diameter is as large as 1 inch, and though used in magnetizing coils that have a clearance of more than ¼ inch all around the core. By diminishing this clearance and using cores of smaller diameter and shorter lengths, the upper limit of frequency can be greatly raised, and then properly constructed comminuted cores with elastic binding material will serve still further to raise the limit of available frequencies.

It will be noted that when vibrating at its fundamental frequency, the two halves of the centrally supported core are driven by equal and oppositely acting forces, so as to communicate practically no motion to the clamp and its base. The apparatus is, therefore, free from one of the sources of trouble and irregularity of tuning forks, the periods of vibration of which are affected by the table or other support on which they are placed. The centrally supported vibrator of the present invention is not dulled, as is a tuning fork, by its own resonance,—a very important consideration where tuned vibrators are necessary.

So well does the present vibrator balance itself about a central pivot 6 that the clamp 6, 8, between which the core is centrally clamped, may be dispensed with and a mere rest 6 take its place, as shown in the beforementioned Letters Patent, upon which the core freely rests centrally. With this arrangement the frequencies may be changed at will by merely pulling out one core and replacing it by another. The core may be otherwise supported also.

For symmetry, one of the coils is positioned on one side of the middle of the core 2 and the other on the other side. The coils may be compacted near the center of the core, or they may be separated or spread out, each over the whole region of the half-length of the core, or they may be replaced by a single coil. The coil 22 is connected, in series with a local battery 18, between the filament or cathode 26 and the plate or anode 28, in the output or plate circuit of a vacuum tube 30. The coil 24 is similarly connected in the input or grid circuit of the tube, between the filament 26 and the grid or third electrode 32. The coils 22 and 24 thus form electrical paths between the filament and the plate, and between the filament and the grid, respectively. An important feature of the invention contemplates the use of a tuned system. For tuning the circuit, or varying the frequency of the alternating current, the grid and the plate may, if desired, be spanned by a variable condenser 34; or tuning condenser 35 may be connected in parallel with one or the other of the coils 22 and 24; or, if the coils are suitably designed, the condenser may be omitted altogether, particularly as the core 2 may itself be a tuned element of very low decrement. By filing the vibrator down, or adding to its mass by solder or plating, or by adding weights, as described in the said Letters Patent, any desired frequency may readily be attained, either high or low. An electric vacuum-tube oscillator is thus provided, having considerable similarity to oscillators of the prior art. The new oscillator, however, comprises a very important novel feature in the transformer for coupling the input circuit and the output circuit together, and comprising the coils 22 and 24 and the mechanically tuned core of magnetizable material for transforming resonant electric energy and feeding it from the output circuit to the input circuit. This transformation of energy is effected, at constant frequency, through the effects produced by the distortion or deformation of the core, as will presently be explained. The tuning is such that high selectivity of frequency is possible in the transfer of energy from one circuit to another. The local battery 18 may serve to supply the plate current. It may serve also to apply a steady magnetizing field to the core 2, over which the alternating field is superposed. Other means of polarizing the vibrator core 2 may also be employed, as is explained in the said Letters Patent. For high-frequency oscillations, the winding of one of the coils 22 and 24 may be reversed as compared with the other winding, and as compared with the arrangement of oscillators of this character as usually constructed. The reversal of the coil is not necessary in all cases, but it has the advantage of making the oscillations much larger and more stable and preventing parasitic electric oscillations by electric feed back, and of restricting the oscillations to periods determined by the mechanically-tuned core.

The system of Fig. 1 may be operated somewhat as follows: For certain settings of the condenser, the system will, or may be, oscillatory in itself; that is, it will oscillate at variable frequency, like any other system of like construction and arrangement, and entirely independently of the core. When, however, the setting of the condenser corresponds to a frequency approximating the natural frequency of the core, the frequency of the alternating current will fall into step with the frequency of the core, and the core will begin to vibrate. When this happens, the condenser may be varied over a comparatively wide range, or even removed altogether, without materially modifying the frequency of the alternating current and the system will oscillate at a frequency determined by the frequency of mechanical vibration of the core 2. Here the core acts as a stabilizer of the frequency, the frequency of the oscillations being substantially constant and equal to the natural frequency of mechanical vibration of the core.

Or, the system may operate as follows: Let it be assumed that the magnetomechanical vibrator is held or damped so as to prevent its vibrations, and that the circuits are so arranged that the system will not oscillate under such conditions. This may readily be effected by preventing feed back between the coils 22 and 24 due to their opposed winding, or their small mutual inductance, or because of their high losses brought about by the presence of the magnetizable core, or because of condenser setting, or for other reasons. With the core in this damped, immobile state, there is no tendency for vibrating currents to appear in the system. Let the damping of the core be now removed. As soon as the core is free to vibrate, its compression, following upon a small disturbance, generates an electromotive force in the grid coil 24. This starts a variable current in the plate coil 22 and further stimulates the core. The magnetization of the plate coil causes the core to lengthen, or shorten, or twist, or become otherwise distorted. This distortion is transmitted along the core to the other half of the core,—the half that started the disturbance,—where it develops a change of magnetization and consequently generates a further electromotive force in the grid coil (assuming a proper design of the circuits). This dual role thus played by the core causes the core to vibrate and the otherwise non-oscillatory system to oscillate and sustain the oscillations at a frequency determined by the frequency of mechanical vibration of the core. The core here actually produces the oscillations by its cooperation with the system. It is characteristic of the system that very small changes of frequency can be brought about only by very large modifications of circuit constants.

In order that the above-described electromotive force may be generated properly in the grid coil, and with the proper phase for stimulating continuous oscillations, coils of the proper character must be connected in the circuit in the proper direction, and the condenser may need to be properly adjusted. Whether the coils 22 and 24 should be wound in one direction or the other depends on the mutual capacity of the coils and on the lag of magnetization with respect to the magnetizing force, and may be determined by experiment with given materials.

Illustrative of constants employed, let us take the case of frequencies as low as 600 per second, with weighted rods, as described in the said Letters Patent, and the case of frequencies as high as 51,000 per second, with unweighted rods 4 centimeters long and 5 to 7 millimeters in diameter. The coils used at the 600-cycle frequency had about 5 henries inductance each, when measured with no iron at the core, and those used at 51,000 cycles had about 0.03 henries inductance each, without iron. To extend the range to higher or lower frequencies, it is merely necessary to adjust the coils and the dimensions of the vibrator. By proper choice of length and other dimensions, the apparatus is applicable to systems of high or low frequency within a range that may extend from a hundred cycles to hundreds of thousands of cycles.

The novel transformer of the present invention may obviously be used to transfer energy between other circuits than the input and the output circuits of the vacuum tube illustrated in Fig. 1. The mechanical vibration of the core may be utilized as a source of energy for this purpose,—for example, as a source of sound; or the electrical alternating currents may be utilized,—for example, to induce electromotive force in some other circuit or coil brought up near to, or wound about, the coil 22. It will also be clear that, instead of the fundamental frequency, any harmonic of the resultant electrical oscillations may be utilized; and, vibrations other than the fundamental longitudinal frequency of the core may also be employed.

The energy from the output circuit may be transmitted to an amplifier in any desired manner, as is also explained in the said Letters Patent.

Other uses, also, will readily suggest themselves, such as for stroboscopic instruments, as is also stated in the said Letters Patent.

To persons skilled in the art many applications and modifications of the apparatus will occur, and no effort has here been made to be exhaustive.

What is claimed is:

1. A transformer having coils for the flow of alternating current, and a magnetostrictive core inductively connected with the coils, the core being substantially tuned to the frequency of the alternating current in one of the coils, whereby energy which is transferred from one coil to the other is transferred substantially entirely by magnetostrictive action of the core at the tuned frequency thereof.

2. An alternating-current system comprising a tuned magnetostrictive vibrator, the vibrator being adapted to vibrate mechanically when stimulated magnetically and to respond magnetically when vibrated mechanically, and two inducting means inductively associated with said vibrator whereby substantially all the energy which is transmitted from one inductive means to the other is transmitted substantially entirely by the magnetostrictive action of said vibrator at its tuned frequency.

3. An alternating-current transformer comprising an input circuit, an output circuit, and means for magnetostrictively coupling the circuits, whereby energy which is transferred from one circuit to the other is transferred substantially entirely by magnetostrictive action.

4. A transformer having coils for the flow of alternating current, and a magnetostrictive core inductively connected with the coils, whereby energy which is transferred from one coil to the other is transferred substantially entirely by magnetostrictive action of the core.

5. A transformer having coils for the flow of alternating current, and a magnetostrictive core inductively connected with the coils, whereby energy which is transferred from one coil to the other is transferred substantially entirely by magnetostrictive action of the core, the winding of one of the coils being reversed with respect to the other coil.

In testimony whereof, I have hereunto subscribed my name.

GEORGE W. PIERCE.